(12) United States Patent
Lempa et al.

(10) Patent No.: US 9,995,250 B2
(45) Date of Patent: Jun. 12, 2018

(54) EXHAUST GAS HEAT EXCHANGER (71) Applicant: BENTELER Automobiltechnik GmbH, Paderborn (DE)

(72) Inventors: Christoph Lempa, Salzkotten (DE); Wassilij Strunin, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days. days.

(21) Appl. No.: 14/973,985

(22) Filed: Dec. 18, 2015

(65) Prior Publication Data

US 2016/0177888 A1    Jun. 23, 2016

(30) Foreign Application Priority Data

Dec. 19, 2014  (DE) .................. 10 2014 119 227

(51) Int. Cl.
*F02M 26/28* (2016.01)
*F28F 9/02* (2006.01)
(Continued)

(52) U.S. Cl.
CPC ............ *F02M 26/28* (2016.02); *F02M 26/32* (2016.02); *F28D 7/1684* (2013.01);
(Continued)

(58) Field of Classification Search
CPC ....... F02M 26/28; F02M 26/32; F28F 9/0248; F28F 9/0256; F28F 9/0282; F28F 9/027;
(Continued)

(56) References Cited

U.S. PATENT DOCUMENTS 2,387,476 A    10/1945  Taylor
3,813,039 A *   5/1974  Wells .................. F28D 21/0008
110/304
(Continued)

FOREIGN PATENT DOCUMENTS

CN    202562353 U    11/2012
DE      2828942 C2    10/1982
(Continued)

OTHER PUBLICATIONS

CN Patent Appln. No. 201510956468.2 Office Action dated Apr. 6, 2017.
(Continued)

*Primary Examiner* — Joseph Dallo
*Assistant Examiner* — Kurt Liethen
(74) *Attorney, Agent, or Firm* — Hauptman Ham, LLP (57) ABSTRACT

The invention relates to an exhaust gas heat exchanger for transferring heat between the exhaust gas of a combustion engine of a motor vehicle and a coolant. The exhaust gas heat exchanger has a housing with connections for supplying and discharging coolant. According to the invention, one connection is formed by a pipe section which has a joining surface, formed on the outer circumference thereof, for fixing on the housing of the exhaust gas heat exchanger and a transfer opening, which is aligned transversely to the longitudinal axis (LA) of the pipe section and communicates with a passage opening in the housing.

8 Claims, 7 Drawing Sheets

(51) Int. Cl.
*F28D 7/16* (2006.01)
*F28D 21/00* (2006.01)
*F02M 26/32* (2016.01)
*F02B 29/04* (2006.01)

(52) U.S. Cl.
CPC ......... *F28D 21/0003* (2013.01); *F28F 9/027* (2013.01); *F28F 9/0248* (2013.01); *F28F 9/0256* (2013.01); *F28F 9/0282* (2013.01); *F02B 29/0462* (2013.01); *Y02T 10/16* (2013.01)

(58) Field of Classification Search
CPC .... F28D 7/1684; F28D 21/0003; Y02T 10/16; F02B 29/0462
See application file for complete search history.

(56) References Cited

U.S. PATENT DOCUMENTS

| | | | |
|---|---|---|---|
| 5,123,480 A * | 6/1992 | Dixit | F28D 13/00 122/4 D |
| 7,857,040 B1 * | 12/2010 | Strohmayer | F28D 1/047 165/159 |
| 2003/0150434 A1 | 8/2003 | Leedham et al. | |
| 2011/0067837 A1 | 3/2011 | Schatz et al. | |
| 2011/0243186 A1 * | 10/2011 | Brautigam | F16L 41/008 374/148 |
| 2012/0090818 A1 | 4/2012 | Dittmann et al. | |
| 2016/0023535 A1 * | 1/2016 | Alber | F24H 9/148 60/320 |

FOREIGN PATENT DOCUMENTS

| | | | |
|---|---|---|---|
| DE | 19907163 C2 | 8/2003 | |
| DE | 102005028806 A1 | 1/2007 | |
| DE | 60119740 T2 | 2/2007 | |
| DE | 102006045535 A1 | 5/2007 | |
| DE | 102011077459 A1 | 12/2011 | |
| EP | 1777480 A1 | 4/2007 | |
| EP | 2436897 A2 | 4/2012 | |
| JP | 2000018881 A * | 1/2000 | |
| JP | 2003314928 A | 11/2003 | |
| JP | 2009114923 A | 5/2009 | |
| KR | 100748756 B1 | 8/2007 | |
| WO | 2013022072 A1 | 2/2013 | |
| WO | WO 2013022072 A1 * | 2/2013 | .............. F28F 9/026 |
| WO | WO 2016008854 A1 * | 1/2016 | .......... F02B 29/0462 |

OTHER PUBLICATIONS

Chinese Office Action for Application No. 201510956468.2 dated Mar. 26, 2018; 16 pp.

* cited by examiner

EXHAUST GAS HEAT EXCHANGER

RELATED APPLICATIONS

The present application claims priority from German Application No. 10 2014 119 227.3, filed Dec. 19, 2014, the disclosure of which is hereby incorporated by reference herein in its entirety.

BACKGROUND OF THE INVENTION

The invention relates to an exhaust gas heat exchanger for transferring heat between the exhaust gas of a combustion engine of a motor vehicle and a coolant in accordance with the features in the preamble of claim 1.

Exhaust gas heat exchangers and the construction and operation thereof are known from EP 2 436 897 A2, DE 601 19 740 T2 or DE 199 07 163 C2, for example. Such heat exchangers are used, in particular, as exhaust gas recirculation coolers or as charge air coolers in motor vehicles.

Each exhaust gas heat exchanger requires coolant connections for supplying and discharging coolant. In general, the connections are embodied as axial pipe stubs, which are joined to the housing. External coolant transfer points are generally provided with pipes. Owing to the installation space and for reasons of cost, the coolant transfer points are close to the cooler. In order to be able to achieve the respective position on the housing of the exhaust gas heat exchanger, small bending radii on pipes or necks on the housing or housing shell and additional punched or milled parts are required in some cases. This is in need of improvement, both in terms of production and of assembly.

DE 10 2011 077 459 A1 discloses a connecting arrangement between a connection pipe and a connecting partner provided on a heat exchanger, wherein the connecting partner has at least one passage opening, which is designed with a shape complementary to that of the connection pipe, and at least one receiving opening, into which the end face of the connection pipe can be inserted at least partially, forming a press fit. The connecting partner has a receiving region for brazing material, wherein the receiving region extends on the axially outer end of the passage opening. The brazing material is arranged in the receiving region.

SUMMARY OF THE INVENTION

Starting from the prior art, it is the underlying object of the invention to indicate an exhaust gas heat exchanger with a connection between the housing and a coolant connection which is improved functionally and in terms of installation space.

According to the invention, this object is achieved by an exhaust gas heat exchanger in accordance with the features of claim 1.

Advantageous embodiments and developments of the invention form the subject matter of dependent claim.

According to the invention, at least one connection, in particular the coolant inlet connection, has a pipe section having a joining surface, formed on the outer circumference thereof, for fixing the pipe section on the housing of the exhaust gas heat exchanger and a transfer opening, which is arranged laterally on the pipe section and communicates with a passage opening in the housing.

In particular, the transfer opening or the surface normal of the transfer opening is aligned transversely to the longitudinal axis of the pipe section.

Transversely to the longitudinal axis means that the transfer opening or the normal extending through the center of the area of the transfer opening is aligned at an angle to the longitudinal axis. The transfer opening is aligned obliquely to the longitudinal axis or is at an angle greater than 0° and less than 180° to the longitudinal axis. In particular, it is aligned at an angle of 45° to 135°, preferably at an angle of 90°+/−30°. In particular, alignment of the transfer opening at a right angle, transversely to the longitudinal axis is envisaged in practice. The transfer opening is provided laterally in or on the pipe wall of the pipe section.

The invention provides an exhaust gas heat exchanger which has a coolant connection that is advantageous in terms of installation space, saves space and is favorable in terms of cost. The coolant connection is formed by a pipe section which is attached radially to the housing of the exhaust gas heat exchanger and is provided with a transfer opening at the envisaged transfer point for the coolant. The pipe section can preferably be flattened at the transfer point. Piping components can be connected to the pipe section at the free end thereof. For this purpose, appropriate coupling elements are provided at the free end of the pipe section. The coupling elements can be a sealing bead, in particular a radially encircling sealing bead formed by upsetting on the free end of the pipe section, for example. The other end of the pipe section, that adjacent to the housing, is closed at the end. This can be accomplished by an end wall or by an end cap or a plug or an end piece.

An advantageous embodiment envisages that the pipe section tapers toward the end thereof adjacent to the housing. It is advantageous if the pipe section is closed at the end thereof adjacent to the housing by a flattened portion. In this case, the pipe wall of the pipe section is upset and pressed together, with the result that the pipe wall or pipe wall sections rest flat one upon the other. In particular, the pipe wall sections are joined fluidtightly to one another in the region of the flattened portion.

Overall, an easier and improved means of obtaining the transfer opening or passage opening in the housing of the exhaust gas heat exchanger is achieved. The coolant connection according to the invention also makes it possible to reach connection points or passage openings in the housing which are awkwardly situated in the installed position of the exhaust gas heat exchanger.

It is particularly advantageous if the joining surface is formed by a flat on the pipe wall of the pipe section.

Another advantageous embodiment envisages that the transfer opening is formed by a hole punched into the pipe wall of the pipe section. The transfer opening can also be produced by a milled or laser-cut hole in the pipe wall of the pipe section. Particularly effective transfer of the coolant is accomplished if the transfer opening is designed as an elongate hole. It is also possible to provide a plurality of transfer openings. It is possible, for example, for two or more holes to form the transfer opening. In particular, the holes are in this case arranged in a row in the longitudinal direction of the pipe section.

The passage opening in the housing is configured fluidically for advantageous transfer of the coolant into and out of the exhaust gas heat exchanger.

The passage opening in the housing or housing shell can also be designed as a round or elongate hole. According to one aspect, one or more holes can be arranged in a row in the longitudinal direction of the pipe section.

Another aspect of the invention envisages that the joining surface has a connection contour matched to the external contour of the housing. In particular, the joining surface is embodied so as to be congruent with the attachment surface on the housing. The pipe section of the coolant connection extends radially on the housing. A coolant line can be connected to the free end of the pipe section.

It is furthermore advantageous that the housing has an attachment surface for the pipe section or a part of the pipe section. In particular, the attachment surface is formed congruently with the outer circumference of the pipe section in the region of coolant transfer. Thus, the receiving section can be of semicircular configuration in order to be able to receive the pipe section.

If the pipe section is embodied with a joining surface which is made flat or is flattened, the attachment surface in the housing is of correspondingly level configuration. This embodiment is advantageous both in terms of production and of assembly.

In particular, the pipe section and the housing are firmly bonded to one another, preferably by brazing.

The exhaust gas heat exchanger and the components thereof are composed of metal, in particular steel materials, preferably stainless steel. The exhaust gas heat exchanger or component parts thereof can also be composed of light metal, in particular aluminum.

To produce the coolant connection, the pipe section is flattened locally and resized to the final geometry by means of a mandrel. The transfer opening is then punched, milled or laser-cut into the pipe wall in the flattened region. In principle, it is also possible for a plurality of transfer openings arranged in a row in the longitudinal direction to be provided in the pipe section. This embodiment can have advantageous effects on the distribution of the coolant within the heat transfer unit in the housing of the exhaust gas heat exchanger.

Another variant of a pipe section envisages that a part or subsection of the pipe wall of the pipe section is removed in order in this way to create the joining surface and the radially aligned transfer opening.

BRIEF DESCRIPTION OF THE DRAWINGS

The invention is described in greater detail below by means of illustrative embodiments shown in the drawings, in which.

Mutually corresponding components and component parts are provided with the same reference signs in all the figures.

DETAILED DESCRIPTION OF SOME EMBODIMENTS

Figure 10:
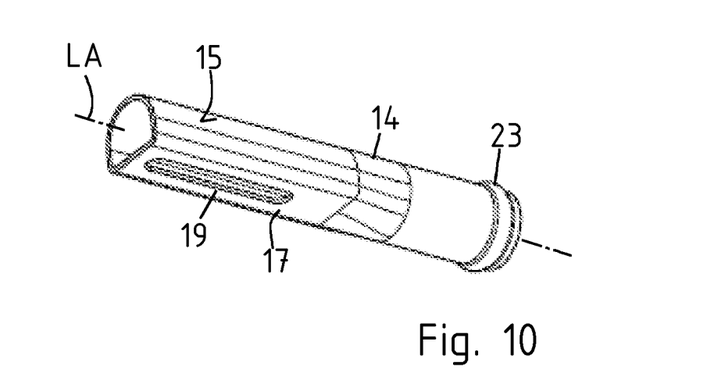
FIG. 10 shows the coolant connection of the exhaust gas heat exchanger according to FIG. 6 in a perspective view.
Figure 11:
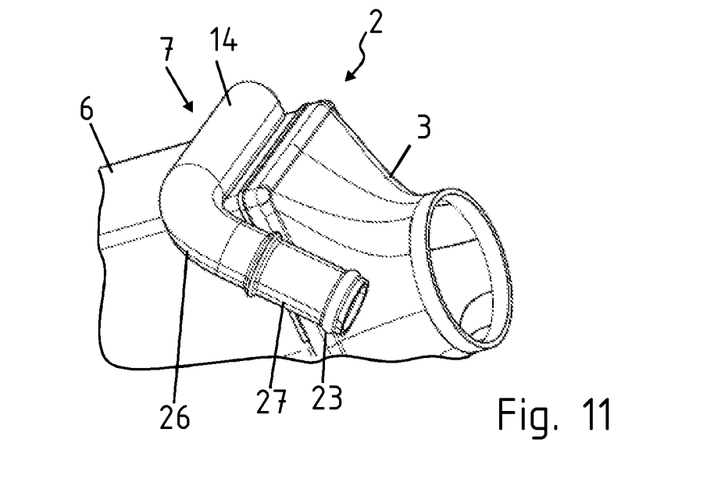
FIG. 11 shows a modification of the exhaust gas heat exchanger.

A first embodiment of an exhaust gas heat exchanger 1 is described with reference to FIGS. 1 to 5. FIGS. 6 to 10 show a second embodiment of an exhaust gas heat exchanger 2. FIG. 11 shows a modification of the exhaust gas heat exchanger 2.

Figure 1:
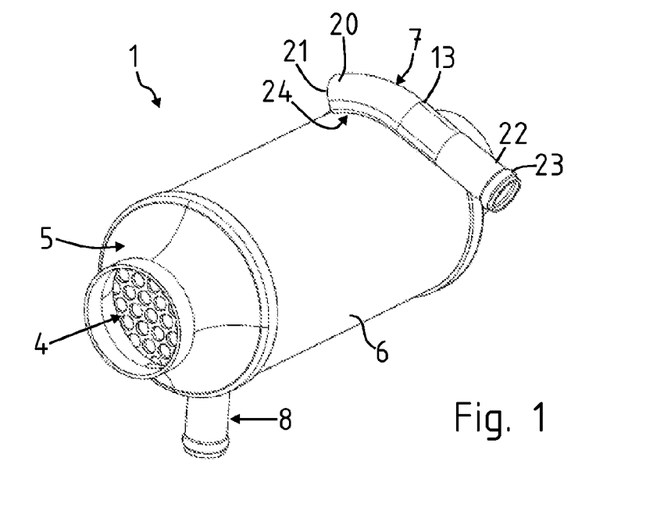
FIG. 1 shows a first embodiment of an exhaust gas heat exchanger according to the invention in perspective.
Figure 2:
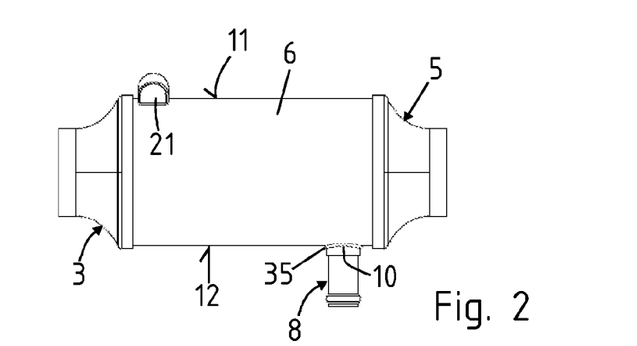
FIG. 2 shows the exhaust gas heat exchanger according to FIG. 1 in a side view.
Figure 3:
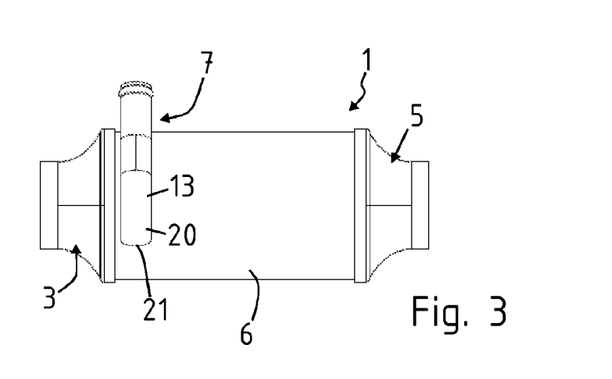
FIG. 3 shows the illustration according to FIG. 2 in a plan view.
Figure 4:
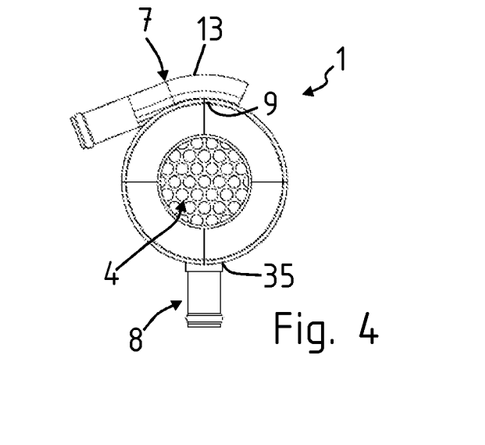
FIG. 4 shows the exhaust gas heat exchanger in an end view.

The exhaust gas heat exchangers 1, 2 are used, in particular, as exhaust gas recirculation coolers in a motor vehicle. Hot exhaust gas flows in via an inflow diffuser 3 and is passed by means of a heat exchanger unit 4, in particular a pipe bundle or a plate assembly, in the interior of the exhaust gas heat exchangers 1, 2, to an outflow diffuser 5, out of which the cooled exhaust gas flows. In the region between the diffusers 3, 5, the heat exchanger unit 4 is surrounded by a housing 6. A liquid coolant is passed through the housing 6, flowing around the heat exchanger unit 4. The coolant is fed to a coolant inlet connection 7 and discharged at a coolant outlet connection 8. Passage openings 9, 10 are provided in the housing 6 for introducing coolant via the coolant inlet connection 7 and for discharging coolant via the coolant outlet connection 8. The coolant inlet connection 7 and the coolant outlet connection 8 are situated on opposite sides 11, 12 of the housing 6. In the present case, the coolant inlet connection 7 is arranged on the upper side 11 of the housing 6 and the coolant outlet connection 8 is arranged on the lower side 12, as seen in the plane of the drawing.

A connection for coolant, namely the coolant inlet connection 7, is formed by a pipe section 13 or 14. On its outer circumference 15, the pipe section 13 or 14 has a joining surface 16, 17 for fixing on the housing 6. The joining surface 16, 17 is formed by a flat on the pipe wall 18 of the pipe section 13, 14 (in this regard, see especially FIGS. 5 and 10).

Figure 5:
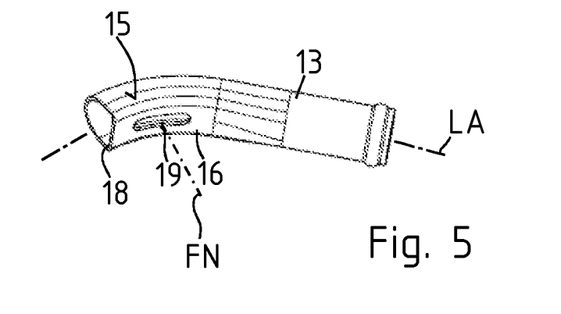
FIG. 5 shows the coolant connection of the exhaust gas heat exchanger in a perspective view.
Figure 6:
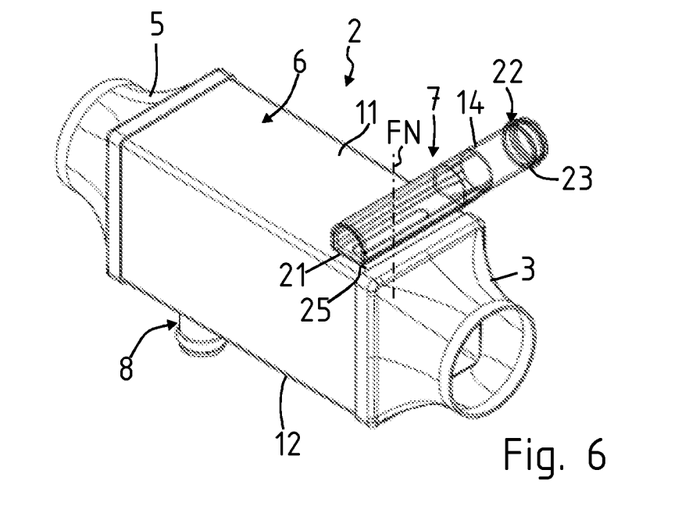
FIG. 6 shows a second embodiment of an exhaust gas heat exchanger according to the invention in a perspective view.
Figure 7:
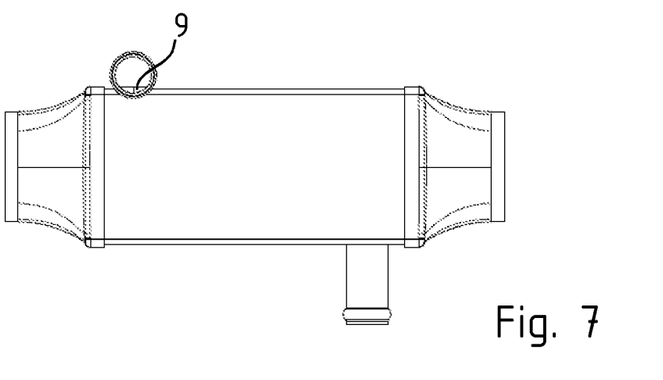
FIG. 7 shows the exhaust gas heat exchanger according to FIG. 6 in a side view.
Figure 8:
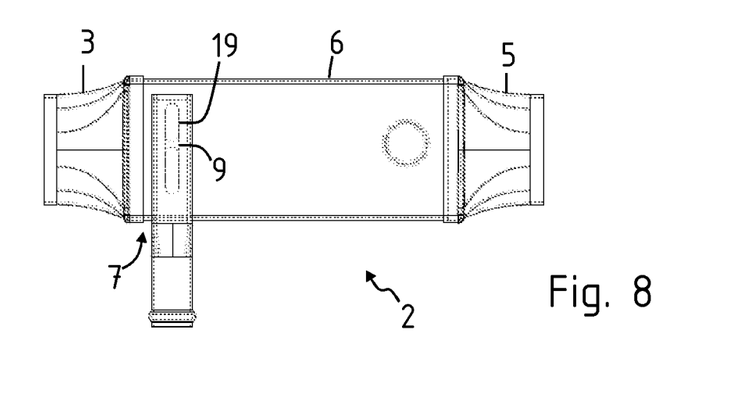
FIG. 8 shows the exhaust gas heat exchanger in a plan view.
Figure 9:
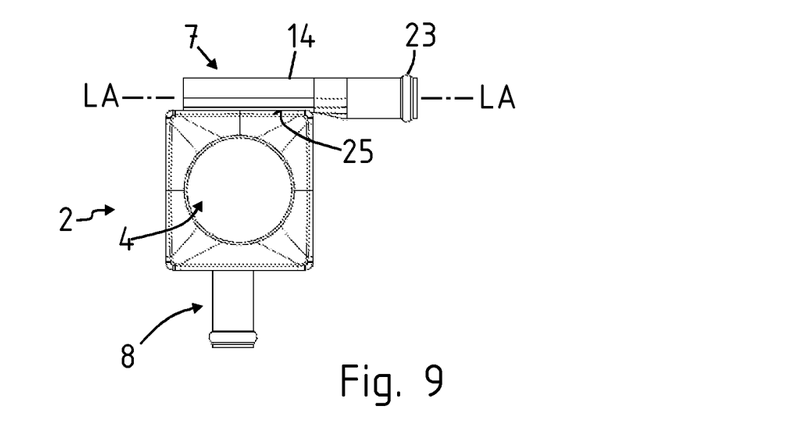
FIG. 9 shows the exhaust gas heat exchanger in an end view.

In the region of the flattened joining surface 16, 17, the pipe section 13, 14 has a laterally exiting transfer opening 19, which communicates with and is fluidically connected to the passage opening 9 in the housing 6. The transfer opening 19 is aligned transversely to the longitudinal axis LA of the pipe section 13, 14. The surface normal of the transfer opening 19 is denoted by FN.

The joining surface 16, 17 has a connection contour matched to the external contour of the housing 6.

Both in the case of exhaust gas heat exchanger 1 and exhaust gas heat exchanger 2, the pipe section 13 or 14 is attached radially to the housing 6. The end 20 of the pipe section 13, 14 adjacent to the housing is closed by an end wall 21. Connecting means 23 in the form of a radially encircling sealing bead are provided on the free end 22 of the pipe section 13, 14 for coupling to upstream piping components.

As can be seen once again particularly from FIGS. 5 and 10, the transfer opening 19 is formed by an elongate hole. The elongate hole is punched into the pipe wall 18 and extends in the longitudinal direction of the flattened joining surface 16, 17.

The housing 6 of exhaust gas heat exchanger 1 is of round configuration. In a congruent configuration with respect thereto, pipe section 13 has a joining surface 16 which is curved or configured as a circular segment to match the outer contour of the housing 6. The attachment surface 24 on the housing 6 is of congruent configuration. The free end 22 of pipe section 13 extends tangentially away from the housing 6.

The housing 6 of exhaust gas heat exchanger 2 is rectangular in cross section. Pipe section 14 extends in a straight line transversely to the longitudinal direction of the housing 6. The joining surface 17 of pipe section 14 is configured so as to be level and rectilinear. The housing 6 has an attachment surface 25 configured in a manner congruent with joining surface 17.

In the embodiment of the exhaust gas heat exchanger 2 illustrated in FIG. 11, pipe section 14 merges via an elbow section 26 into a rectilinear free end section 27 of the coolant inlet connection 7.

Figure 12:
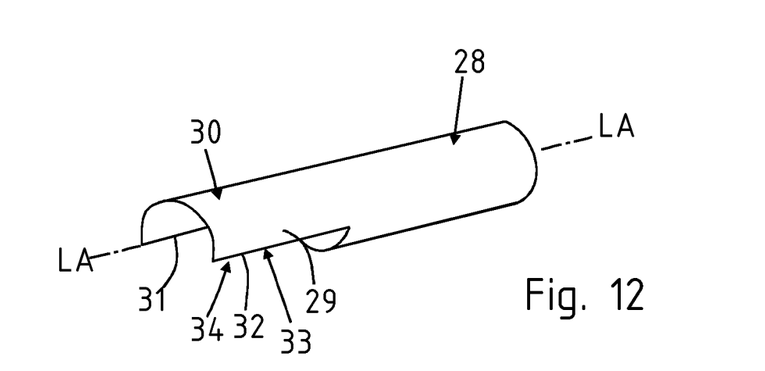
FIG. 12 shows another embodiment of the coolant connection in perspective.

Another embodiment of a pipe section 28 is shown by FIG. 12. In this embodiment, the pipe wall 29 has been partially removed in an end section 30 adjacent to the housing. The longitudinal edges 31, 32 in the region removed form a joining surface 33. Transfer opening 34 is aligned transversely to the longitudinal axis LA of pipe section 28.

Figure 13:
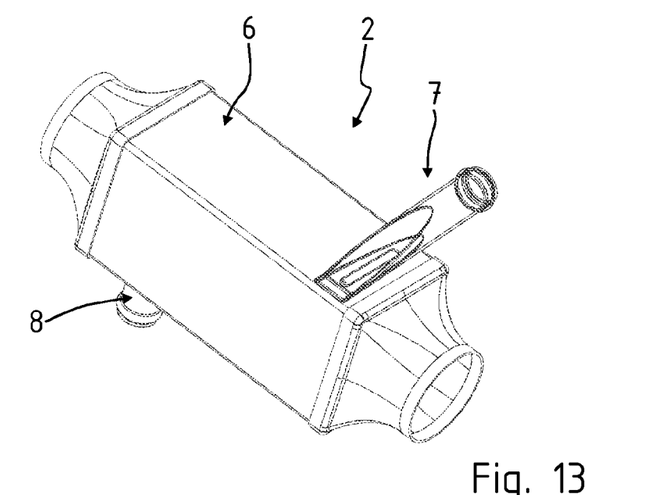
FIG. 13 shows another embodiment of an exhaust gas heat exchanger according to the invention in a perspective view.
Figure 14:
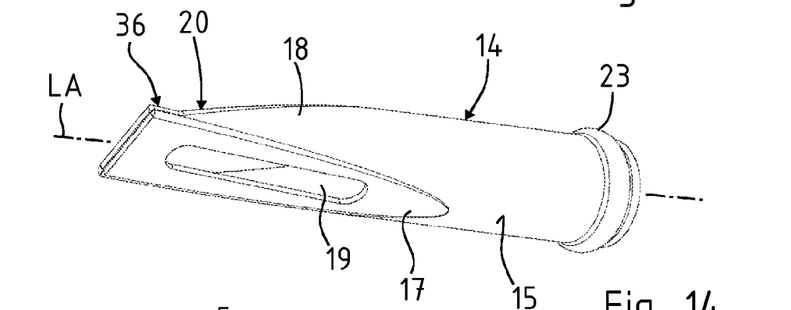
FIG. 14 shows the coolant connection of the exhaust gas heat exchanger according to FIG. 13 in a perspective view.
Figure 15:
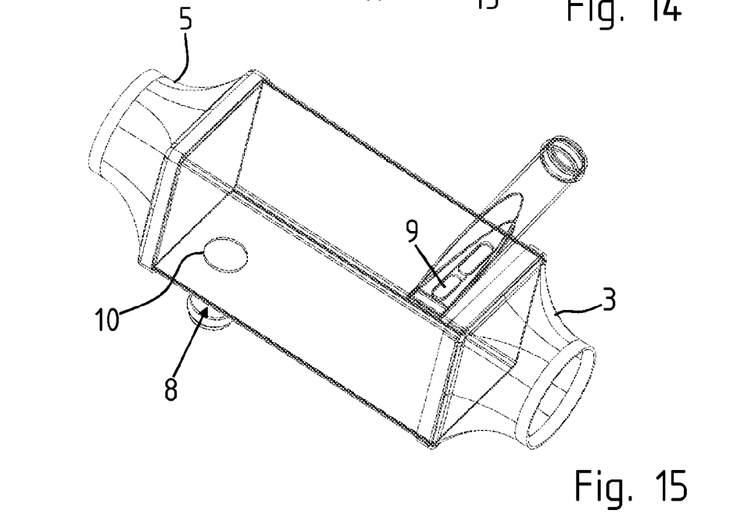
FIG. 15 shows a modification of the exhaust gas heat exchanger according to FIG. 13 in perspective.

The exhaust gas heat exchanger 2 shown in FIGS. 13 to 15 also has a housing 6 embodied with a rectangular cross section. The coolant inlet connection 7 is formed by a pipe section 14 which has, on its outer circumference 15, a joining surface 17 for fixing on the housing 6. Joining surface 17 is formed by a flat on the pipe wall 18 of pipe section 14. In the region of joining surface 17, pipe section 14 has a laterally arranged transfer opening 19. Transfer opening 19 is aligned transversely to the longitudinal axis LA of pipe section 14. Transfer opening 19 is an elongate hole, which communicates with two passage openings 9 in the housing 6 and is connected fluidically thereto. Pipe section 14 tapers toward an end 20 adjacent to the housing. In this case, the end 20 adjacent to the housing is closed by a flattened portion 36. It can be seen that the pipe wall is upset and pressed together at the end 20 adjacent to the housing.

Figure 16:
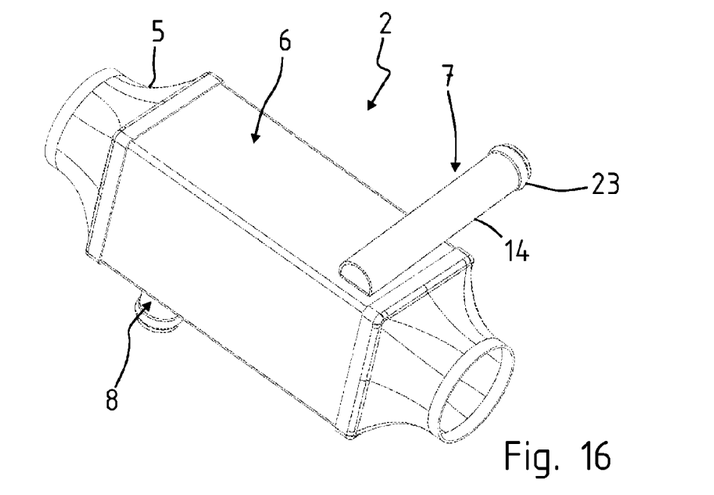
FIG. 16 shows another embodiment of an exhaust gas heat exchanger according to the invention in a perspective view.
Figure 17:
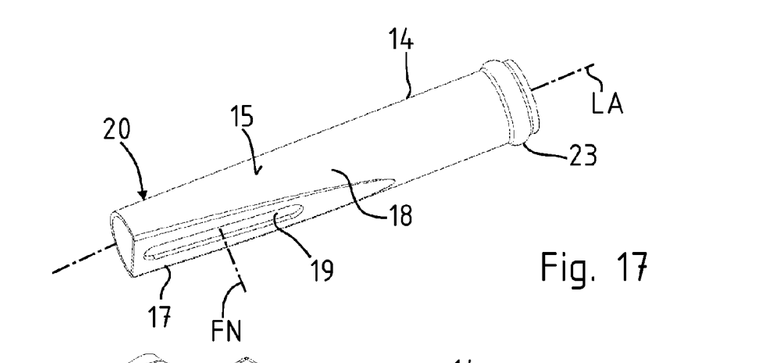
FIG. 17 shows the coolant connection of the exhaust gas heat exchanger according to FIG. 16 in a perspective view.
Figure 18:
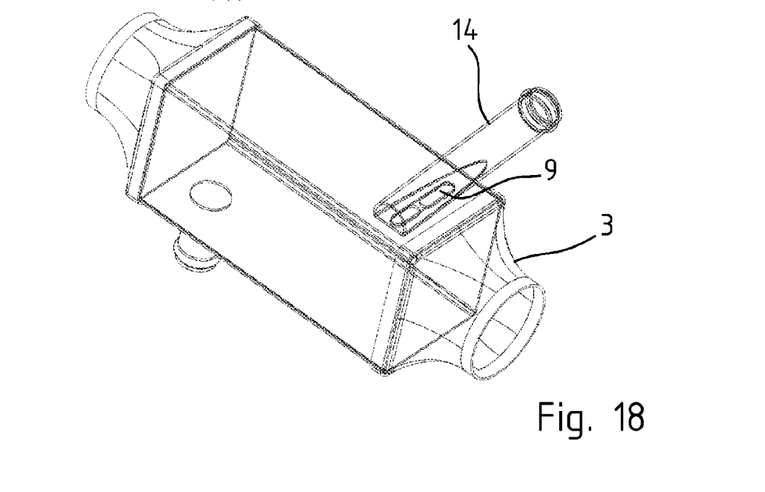
FIG. 18 shows the exhaust gas heat exchanger according to the illustration in FIG. 16 in perspective, showing the coolant transfer.

The exhaust gas heat exchanger 2 illustrated in FIGS. 16 to 18 is of similar design in terms of configuration. Pipe section 14 extends in a straight line transversely to the longitudinal direction of the housing 6. Pipe section 14 tapers toward the end 20 adjacent to the housing. In this case a joining surface 17 is formed by a flat on the pipe wall on the end section 20 of pipe section 14 adjacent to the housing. Joining surface 17 has a parabolic configuration. Transfer opening 19 is formed by an elongate hole. Transfer opening 19 extends in the longitudinal direction of the pipe section and is arranged laterally on or in the pipe wall of the pipe section. In this case, transfer opening 19 or the surface normal of transfer opening 19 is aligned transversely to the longitudinal axis LA of pipe section 14, with the result that coolant flows laterally out of pipe section 14 and into the housing 6 of exhaust gas heat exchanger 2. The transfer opening communicates with two passage openings 9 in the upper side wall of the housing 6. The passage openings 9 are elongate holes.

The coolant connection 7 of the exhaust gas heat exchangers 2 illustrated by means of FIGS. 13 to 15 and 16 to 18 has a pipe section 14 which is attached radially to the housing 6. Joining surface 17 is in each case matched to the outer contour of the housing 6 by a connection contour. Connecting means 23 are provided at the free end 22 of pipe section 14.

In the illustrative embodiments shown, the coolant inlet connection 7 is embodied in a manner according to the invention. The coolant outlet connection 8 is placed against the housing 6 by means of its end 35 adjacent to the housing and is joined there. The coolant outlet connection 8 is connected fluidically to the passage opening 10 in the housing 6. It is self-evident that the coolant outlet connection 8 is also embodied in accordance with the invention, with a pipe section corresponding to the embodiment described with reference to the coolant inlet connection 7.

REFERENCE SIGNS

1—exhaust gas heat exchanger
2—exhaust gas heat exchanger
3—inflow diffuser
4—heat exchanger unit
5—outflow diffuser
6—housing
7—coolant inlet connection
8—coolant outlet connection
9—passage opening
10—passage opening
11—upper side of 6
12—lower side of 6
13—pipe section
14—pipe section
15—outer circumference
16—joining surface
17—joining surface
18—pipe wall
19—transfer opening
20—end of 13, 14 adjacent to the housing
21—end wall
22—free end of 13, 14
23—connecting means
24—attachment surface
25—attachment surface
26—elbow section
27—end section
28—pipe section
29—pipe wall
30—end section
31—longitudinal edge
32—longitudinal edge
33—joining surface
34—transfer opening
35—end of 8 adjacent to the housing
36—flattened portion
LA—longitudinal axis
FN—surface normal

The invention claimed is:
1. An exhaust gas heat exchanger for transferring heat between the exhaust gas of a combustion engine of a motor vehicle and a coolant, comprising:

a housing, which has connections for supplying and discharging coolant, wherein at least one connection has a pipe section having a joining surface, formed on the outer circumference thereof, for fixing on the housing and a transfer opening, which is aligned transversely to the longitudinal axis (LA) of the pipe section and communicates with a passage opening in the housing, and wherein the joining surface includes a flattened portion of an outer surface of the pipe wall itself and extending from a peripheral edge of said pipe.

2. The heat exchanger as claimed in claim 1, wherein the joining surface has a connection contour matched to the external contour of the housing.

3. The heat exchanger as claimed in claim 1, wherein the pipe section is attached radially to the housing.

4. The heat exchanger as claimed in claim 1, wherein the transfer opening is formed by one or more holes in the pipe walls, in particular by an elongate hole.

5. The heat exchanger as claimed in claim 1, wherein the housing has an attachment surface formed congruently with the joining surface of the pipe section.

6. The heat exchanger as claimed in claim 1, wherein the pipe section tapers toward the end thereof adjacent to the housing.

7. The heat exchanger as claimed in claim 1, wherein the end of the pipe section adjacent to the housing is closed at the end.

8. The heat exchanger as claimed in claim 1, wherein the pipe section is closed at the end thereof adjacent to the housing by a flattened portion.

* * * * *